Patented Dec. 26, 1944

2,365,662

UNITED STATES PATENT OFFICE 2,365,662

DEPIGMENTIZING RECLAIMED RUBBER

Harry H. Thompson, Akron, Ohio, assignor to Wingfoot Corporation, Akron, Ohio, a corporation of Delaware No Drawing. Application March 6, 1942,
Serial No. 433,672

3 Claims. (Cl. 260—714)

This invention relates to a method of removing pigments, etc. from reclaimed rubber stock.

According to this invention, the reclaimed stock is mixed with bentonite or other clarifier mineral. This mixture is then extracted with a rubber solvent. The bentonite retards or prevents the removal of the carbon black from the reclaimed stock and contamination of the resulting rubber solution by it. Reclaimed rubber containing any amount of carbon black, even a tire reclaim of high carbon-black content, yields by this process an amber-colored rubber solution which is free, or substantially free of carbon black.

For the extraction the reclaimed rubber may be dispersed in water, or the reclaimed rubber-clarifier mineral blend may be used straight. Various modifications of the process are possible.

In a preferred procedure, the bentonite is milled into the devulcanized reclaimed stock. The resultant product is divided into small pieces or particles and then these are subjected to extraction with a rubber solvent.

For example, 120 pounds of devulcanized and dried tire reclaim (from which the fabric has been removed in the devulcanizing process) is thoroughly mixed with 60 pounds of bentonite on an apron mill. It is massed off the mill in a sheet about one-eighth of an inch thick. The sheet is then cut into small squares, for example, two inches square. These blocks are charged into an extraction basket in which they are refluxed with benzol for about eight hours. For refluxing, 60 gallons of benzol may be used in a 200 gallon extraction vessel. This dissolves out the rubber, producing an amber-colored benzene cement of about 10% rubber hydrocarbon content. This may be used for the manufacture of cements; it may be treated with chemicals to produce rubber derivatives; the reclaimed, depigmentized rubber may be recovered from it by evaporation of the solvent; or it may be used in any other suitable manner.

The length of refluxing will of course depend upon the thickness and area of the blocks treated. The amount of bentonite required will depend upon the amount of carbon black present. At least about 20% by weight of the reclaim will ordinarily be used. Instead of bentonite, fuller's earth or other clarifying mineral may be used.

In another process the reclaim rubber was mixed with the bentonite on a mill, and water containing casein or other dispersing agent was added to make a heavy paste. This was then extracted with the rubber solvent.

The residue from the extraction which contains the bentonite may be blended with several times its weight of untreated reclaimed rubber, and the resulting mixture with a greatly reduced bentonite content may then be used as reclaim is ordinarily used.

Many variations of the process are possible within the scope of the appended claims.

I claim:

1. The treatment of carbon-black-containing devulcanized rubber stock which comprises intimately mixing at least 20% by weight of bentonite with the stock and then extracting with a rubber solvent while the bentonite inhibits removal of the carbon black by the solvent.

2. The treatment of carbon-black-containing devulcanized rubber stock which comprises milling at least 20% by weight of bentonite into the reclaim stock and then extracting rubber therefrom with benzol.

3. The treatment of carbon-black-containing devulcanized rubber stock which comprises intimately mixing the stock with at least 20% by weight of a material selected from the group consisting of bentonite and fuller's earth and then extracting rubber therefrom with a rubber solvent.

HARRY H. THOMPSON.